United States Patent [19]

Simciak

[11] 3,919,640

[45] Nov. 11, 1975

[54] SIMULTANEOUS ANALOG AND DIGITAL DATA TRANSFER

[75] Inventor: Walter Simciak, Longwood, Fla.

[73] Assignee: Northern Illinois Gas Company, Aurora, Ill.

[22] Filed: Nov. 8, 1974

[21] Appl. No.: 521,953

[52] U.S. Cl. .................... 325/30; 325/67; 325/113; 340/152 T; 340/249

[51] Int. Cl.² ............................................ H04B 1/00

[58] Field of Search ........... 325/30, 163, 2, 3, 8, 67, 325/7, 13, 151, 152, 363, 492, 113, 320, 15, 17; 178/66 R, 66 A; 340/152 T, 171 A, 171 PF, 204, 248, 249

[56] References Cited

UNITED STATES PATENTS

| | | | |
|---|---|---|---|
| 2,378,013 | 6/1945 | Hilferty | 325/163 |
| 3,555,502 | 1/1971 | Davis et al. | 325/113 |

*Primary Examiner*—Albert J. Mayer
*Attorney, Agent, or Firm*—Johnson, Dienner, Emrich & Wagner

[57] ABSTRACT

An apparatus is disclosed for simultaneously transferring via electromagnetic waves analog and digital data from a remote transponder to a fixed or mobile central control station. Digital data is transmitted from the remote transponder to the fixed or mobile central control station and at the same time the DC voltage of the battery powering the remote station is measured and transmitted to the central or mobile interrogating station.

6 Claims, 3 Drawing Figures

| BATTERY CONDITION LEVEL | LEVEL CODE | | | |
|---|---|---|---|---|
| (NEW) 1 | 1 | 0 | 0 | 0 |
| 2 | 1 | 1 | 0 | 0 |
| 3 | 0 | 1 | 0 | 0 |
| 4 | 0 | 1 | 1 | 0 |
| 5 | 0 | 0 | 1 | 0 |
| 6 | 0 | 0 | 1 | 1 |
| (OLD) 7 | 0 | 0 | 0 | 1 |

SIMULTANEOUS ANALOG AND DIGITAL DATA TRANSFER

BACKGROUND OF THE INVENTION

1. Field of the Invention

This invention relates to remote register reading systems and more particularly to a remote register reading system in which digital data representing a meter reading is transmitted over a UHF radio signal link or a communication line to an interrogating station from a register remotely located from the interrogating station. Simultaneously, analog data represention for disclosing the condition of the battery powering the remotely located reading system is also transmitted to the interrogating station from the remote station.

2. Description of the Prior Art

In order to minimize the cost of reading meters which measure the consumption of a commodity such as gas, electricity, water or the like, a transponder is provided at the location of each meter which is to be read and the read-out of each meter is controlled from an interrogating position of a control station which may be mobile or fixed. The transponder unit forms a compact package which can easily be attached to existing meters and consists of the basic unit providing data control and data storage, and an RF module which is used to receive RF signals transmitted from the interrogating station, and to transmit data representing the reading of the interrogated meter to the interrogating station. Such a transponder is normally powered by a battery. Since the condition of the battery located in the remote station deteriorates with time and usage, it is desirable to know the condition of the battery in order to effect replacement before it actually becomes inoperative. One technique for obtaining this information is to provide a "low battery detector circuit" within the battery operated remote station, which circuit detects whether or not the battery is good, and to transmit that information to the mobile or central interrogating station. This type of information indicates merely whether the battery is in good shape or is weak. It does not give any indication as to how weak the battery may be and how much life there may be remaining in the battery. In order to determine this condition, an approximate measure of the voltage at the remote station is required and the transmission of this voltage to the mobile or central station. One technique for performing this is to measure the voltage of the battery at the remote station, encode it into digital information and then transmit it along with the meter reading. This solution however is expensive in that an analog to digital converter is required for each remote station; moreover, additional transmission time would be added since this analog information would be separately transmitted. What is needed is an inexpensive and efficient method and apparatus for transmitting the voltage level of the battery powering the remote station to the mobile or central interrogating station simultaneously with meter data transmitted.

OBJECTS OF THE INVENTION

It is a primary object of the invention to provide an improved remote meter reading system.

Another object of the invention is to provide an improved remote meter reading system wherein digital data is transmitted from a remote meter station to a mobile or central interrogating station and at the same time the DC voltage of the battery powering the remote station is measured and transmitted to the central or mobile interrogating station.

It is still another object of the invention to provide apparatus in the remote station for determining and transmitting the voltage to a central or a mobile interrogating station, whereas apparatus for encoding that voltage into one of a plurality of levels is provided in the mobile or central interrogating station.

SUMMARY OF THE INVENTION

The foregoing objects are achieved according to one embodiment of the invention by providing a frequency shift key (FSK) technique for encoding data wherein one frequency represents the binary digit zero and another frequency represents the binary digit one. One of the FSK data oscillators is a voltage controlled oscillator (VCO) whose frequency is proportional to the DC voltage of the battery powering the remote station. When data of this VCO is transmitted to the central or mobile interrogating station, it includes information as to the condition of the battery by virtue of its center frequency in relation to the allotted frequency band. This information is then encoded into a binary code which is indicative of the battery condition level.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

DESCRIPTION OF A PREFERRED EMBODIMENT

Figure 1:
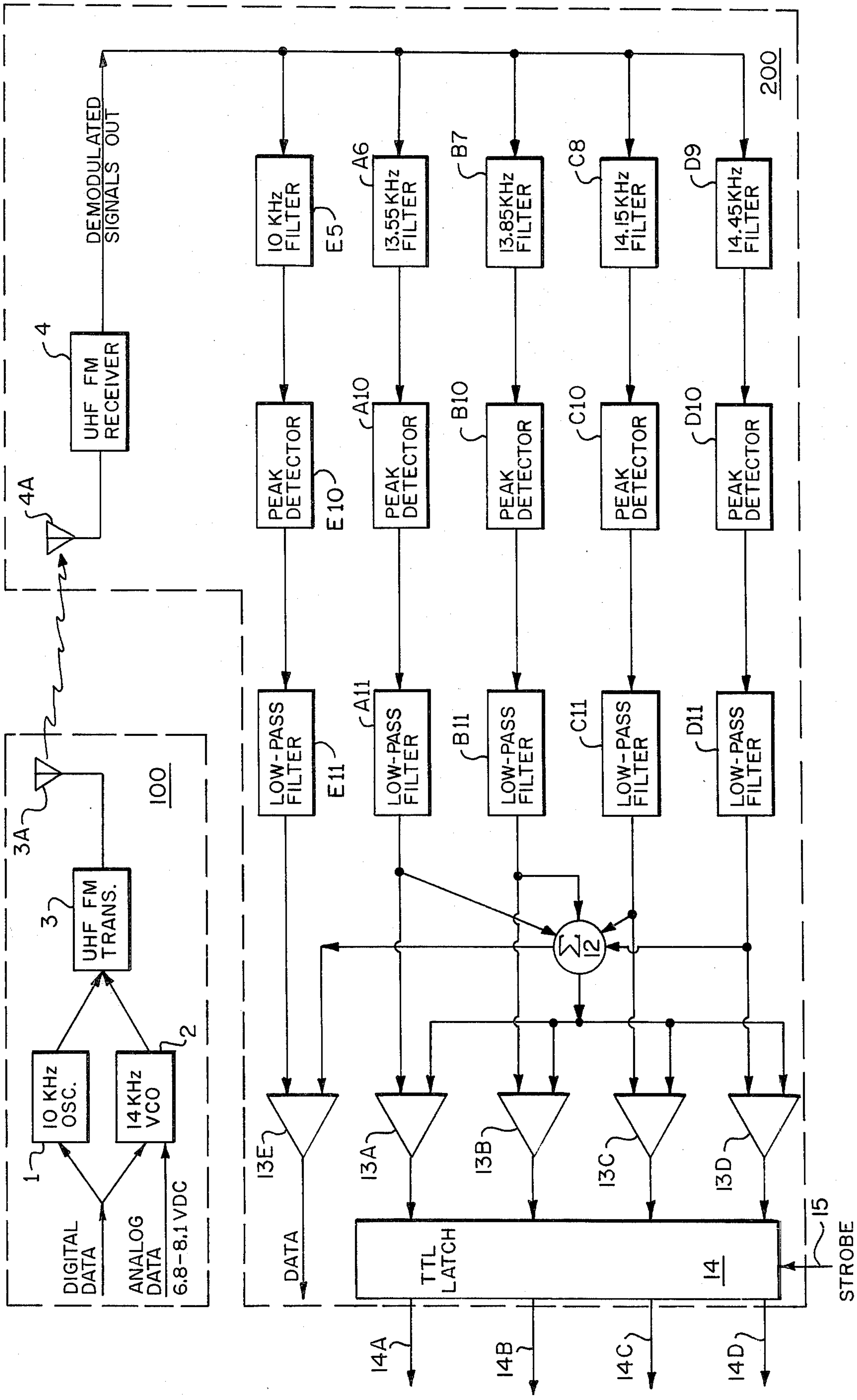
FIG. 1 is a schematic diagram of the invention.

Referring to FIG. 1 there is shown a block diagram of the battery operated remote station 100 and a schematic diagram of the central or mobile interrogating station 200 including the battery condition level encoder. The details of the battery operated remote station and the interrogating station are shown and described in a patent entitled Remote Meter Reading System issued to James E. Batz on Dec. 5, 1972 and having U.S. Pat. No. 3,705,385. The following description concentrates on the improvements to this system.

Referring once again to FIG. 1 there is shown a 10 KHz sign wave oscillator 1 and a 14 KHz voltage controlled oscillator (VCO) 2. They are utilized in transmitting the digital data from a remote meter to be read. In this embodiment a binary 0 is represented by the 10 KHz frequency and a binary 1 is represented by the 14 KHz frequency. The digital data keys either the 10 KHz sign wave oscillator 1 or the 14 KHz sign wave oscillator 2 on and off depending on the data to be transmitted. The output signals of these 2 oscillators 1 and 2 is transmitted via ultra high frequency (UHF) transmitter 3 and antenna 3A to UHF receiver 4 in the mobile or central interrogating station 200. Since the 14 KHz frequency is generated by a VCO which is coupled to the battery powering the remote station, the frequency output of VCO 2 has a range of 14.45 KHz at 6.8 volts and 13.55 KHz at a voltage of 8.1 volts. It is to be understood that the VCO could be designed to operate with a range of 14.45 KHz at 8.1 volts to 13.55 KHz at 6.8 volts or any other frequency or voltages selected. It can be seen by referring to FIG. 3 that the 14 KHz channel is comprised of four frequency bands A, B, C and D, each 300 Hertz wide and having center frequencies of 13.55, 13.85, 14.15 and 14.45 KHz respectively. Accordingly, depending on the condition of the battery, the signal generated by the VCO 2 will fall in the range of 13.55 to 14.45 KHz. Assuming that it is a new battery generating 8.1 volts DC, the frequency generated by the VCO 2 will be centered at approximately the center of channel A, shown as point 3A on FIG. 3. The apparatus to be described below codes this frequency into the binary number 1000 which indicates a level 1 new battery. (See FIG. 2). On the other hand, if the frequency generated by the VCO 2 lies midway between channel A and B at point 4A which is 3DB down from the center frequency the apparatus described below codes this condition as 1100 or a level 2 battery condition (see FIG. 2). The discussion that follows shows how this coding procedure is performed by the disclosed apparatus.

Referring once again to the central or mobile interrogating unit 200, the UHF receiver 4 receives the signals from the remote station 100 and demodulates it back into base band. The base band signal is then applied to a 10 KHz active band pass filter E5 having a center frequency of 10 KHz and to a contiguous bank of 14 KHz active band pass filters A6, B7, C8 and D9 having center frequencies of 13.55, 13.85, 14.15 and 14.45 KHz respectively. The output of all the filters are detected by their respective peak detectors E10, A10, B10, C10 and D10, and are then integrated by their respective low pass filters E11, A11, B11, C11 and D11 — i.e., the output of 13.55 KHz band pass filter A6 is peak detected by its corresponding peak detector A10 and is integrated by its respective low pass filter A11 etc. Each low pass filter A11–E11 has sufficient band width to pass the data rate. The output signals of the low pass filter A11–E11 are applied to their respective voltage comparators 13A–13E. Moreover, the output signals of low pass filters A11–D11 are also summed together and scaled in summation amplifier 12. This type of summation unit is well known in the art and described in the literature of this art. Any scaling factor which is suitable may be utilized, however in this embodiment a scaling factor of 0.3 is utilized. This summed/scaled voltage is then applied to voltage comparators 13A–13E, and is the threshold reference voltage to be utilized by the comparators. Any voltage below this reference voltage will output a binary 0 whereas any voltage above this reference voltage will output a binary 1.

This reference voltage is:

$$V_{ref} = K\ (V_a + V_b + V_c + V_d)$$

Where $K$ is the first scaling factor equal to 0.3 and $V_a$ = Voltage output of the A11 low pass filter;

$V_b$ = Voltage output of the B11 low pass filter;

$V_c$ = Voltage output of the C11 low pass filter;

$V_d$ = Voltage output of the D11 low pass filter.

The output signals of voltage comparators 13A–13D are applied to the input terminals of TTL latch unit 14. (TTL latch unit 14 is readily available commercially from Texas Instrument Corporation and is of the type designated by Texas Instrument in their catalog as SN7475N). This latch has the characteristic that it will hold the same pattern of high and low voltage signals that were present on its input terminals at the time a strobe signal 15 is applied. Hence, if the output signal of comparator 13A is high and the output signals of comparators 13B–13D are low at the time a strobe signal 15 is applied to TTL latch 14, a high signal will be maintained at terminal 14A and low signals will be maintained at terminals 14B–14D. The TTL latch 14 is strobed by a strobe signal 15 by the interrogating unit 200 at a time when the interrogating unit 200 has received a 14 KHz signal tone.

Figures 2, 3:
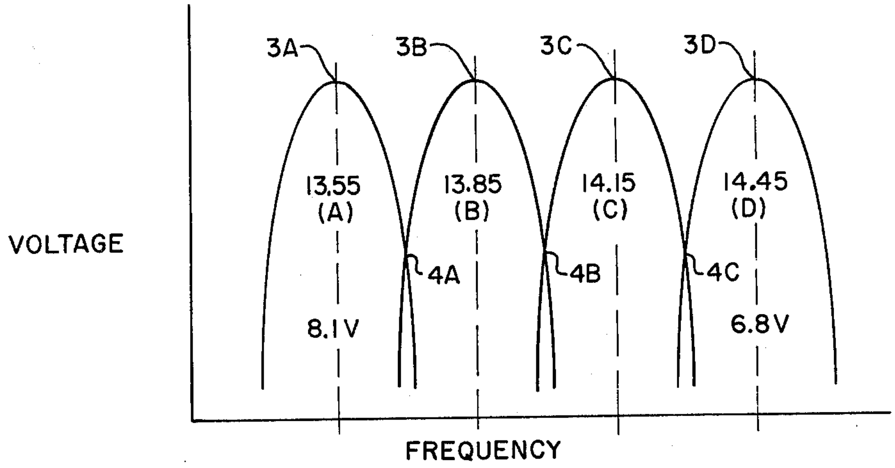
FIG. 2 is one code pattern which is generated by the invention which is indicative of the battery condition level.
FIG. 3 are the groups of center frequencies with their associated widths comprising the frequency band control by the VCO.

In order to illustrate the operation of the invention, assume that the battery condition is level 3 which is indicated by level binary code 0100 on FIG. 2. Referring to FIG. 3, level 1 is typically represented by point 3A. Level 3 is typically represented by point 3B, level 4 is typically represented by point 4B etc. Accordingly, level 3 would be represented on FIG. 3 by point 3B which is the center frequency 13.85 KHz of channel B. Accordingly, by referring to FIG. 1 and FIG. 3, the level 3 battery condition will have a frequency to voltage response which is high for channel B representing the band width that filter B7 will pass and will be available at the output of low pass filter B11. The following Table I shows the various response for the band pass filters, low pass filters and comparator outputs of each channel for the above stated condition.

TABLE I

| Channel | Filter Response | Low Pass Output Voltage | Comparator Output |
|---|---|---|---|
| A | 6db | .5 | 0 |
| B | 0db | 1.0 | 1 |
| C | 4.5db | .596 | 0 |
| D | 10db | .1 | 0 |

Summing the low pass output voltages gives a total of 2.196 and by multiplying this by the scaling factor of .3 a reference voltage of .6588 is obtained. For this condition, this reference voltage of .6588 is applied as a reference voltage to each of the comparators 13A–13D. The other voltage applied to each comparator 13A–13D is the output voltage from the low pass filters A11–D11. Referring to Table I, it is seen that a low pass filter voltage of .5 will be applied to the other input terminal of comparator 13A. Since this is lower than the reference voltage .6588, a zero will result at strobe time on output terminal 14A. Similarly, the output voltage from low pass filter B11 applied to comparator 13B is higher than the reference voltage applied to comparator 13D and accordingly a logical 1 will result on terminal 14B of TTL latch 14 at strobe time. By carrying this analysis through, it will be seen that zeroes will result at the output terminals 14C and 14D of TTL latch 14. Hence, it is seen that the third level has been coded by the apparatus into a 0100 code. Referring now to FIG. 2, a 0100 level code is a battery condition indicative of a level 3 condition. Accordingly, there is some substantial period of life remaining to the battery before it goes bad and no further action need be taken at the time when a level 3 condition exists.

In order to illustrate how a code results when the VCO frequency lies in the middle of two filter frequencies, assume that the battery is in such condition that the VCO frequency lies in the middle of filters A6 and B7 or point 4A on FIG. 3. It will be seen that this is a level 2 condition and accordingly a level code 1100

(see FIG. 2) must be generated. To illustrate the generation of this code for a level 2 battery condition, the following Table II illustrates the responses of the various filters and comparators.

TABLE II

| Channel | Filter Response | Low Pass Output Voltage | Comparator Output |
|---|---|---|---|
| A | 2.9db | .7161 | 1 |
| B | 2.9db | .7161 | 1 |
| C | 7.5db | .4217 | 0 |
| D | 12.5db | .2371 | 0 |

Referring now to this table it will be observed that summing the outputs of the low pass filters A11–D11, a voltage summation of 2.091 results and when this is multiplied by the scaling factor of .3 a reference voltage level of .6273 results. This reference voltage level is once again applied to each of comparators 13A through 13D. By going through the reasoning that was illustrated with respect to Table I, it will be seen that terminal 14A will have a high signal or binary 1, terminal 14B will also have a high signal or a binary 1, whereas terminals 14C and 14D will each have a zero signal resulting in a binary coded number 1100. Referring to FIG. 2, a binary code of 1100 is a level 2 battery condition.

Although in this embodiment seven levels have been shown, it can readily be appreciated that any number of levels may be utilized by the selection of the FSK band width and the width of the sub-bands within the primary FSK band width. Moreover, while the invention has been particularly shown and described with reference to a preferred embodiment thereof, it will be realized by those skilled in the art that changes in form and details may be made therein without departing from the spirit and scope of the invention.

What is claimed is:

1. An apparatus for simultaneously transmitting via electromagnetic waves analog and digital data signals to a mobile or fixed central station from a selected transponder associated with a selected one of said plurality of remote meter reading stations, said analog data signals representing the voltage level of a battery which supplies electric power to said selected remote transponder, and said digital data signals representing information obtained by said selected transponder from its associated remote meter reading station, said apparatus comprising:

a. frequency shift key (FSK) means in each of said remote transponders for encoding digital data at a predetermined frequency for wireless transmission to said mobile or fixed central station from a selected one of said remote transponders;

b. voltage control (VCO) means in each of said remote transponders, one each of said FSK means being coupled to one each of said VCO means, said VCO means for shifting the frequency of its associated FSK means in proportion to the voltage level supplied by a battery associated to said selected one of said remote transponders; and, c. UHF FM transmitting means in each of said remote transponders for wirelessly transmitting to said fixed or central station from a selected one of said transponders the FSK encoded digital information signals and the analog frequency shifted information signals representative of the battery voltage level.

2. The apparatus as recited in claim 1 including receiving means in said fixed or mobile central station for receiving the FSK encoded digital information signals and the analog frequency shifted information signals.

3. The apparatus as recited in claim 2 further including decoding means coupled to said receiving means for translating the received analog frequency shifted signals into binary coded signals.

4. The apparatus as recited in claim 3 wherein said decoding means comprises:

a. first means for providing a reference signal from said received analog frequency shifted signals;

b. second means for subdividing said received analog frequency shifted signals into a predetermined number of component-frequencing signals; and, c. comparing means for comparing each of the component frequency signals with the reference signal.

5. The apparatus as recited in claim 4 wherein said comparing means provides a high DC signal (i.e., logical one) when the component frequency signal is higher than the reference signal, and further provides a low DC signal (i.e., logical zero) when the component frequency signal is lower than the reference signal.

6. The apparatus as recited in claim 5 including latch means for preserving the signals obtained from the comparing means.

* * * * *